(12) United States Patent
Terada et al.

(10) Patent No.: US 7,281,854 B2
(45) Date of Patent: Oct. 16, 2007

(54) OIL-FEEDING DEVICE FOR AN ENGINE CRANKSHAFT

(75) Inventors: Tatsuhiro Terada, Susono (JP); Tomohiro Kanoh, Toyota (JP); Yasuhiro Hikita, Toyota (JP); Masao Yamazaki, Nishikamo-gun (JP)

(73) Assignee: Taiho Kogyo Co., Ltd., Toyota (JP)

( * ) Notice: Subject to any disclaimer, the term of this patent is extended or adjusted under 35 U.S.C. 154(b) by 151 days.

(21) Appl. No.: 10/531,916

(22) PCT Filed: Oct. 23, 2003

(86) PCT No.: PCT/JP03/13527

§ 371 (c)(1),
(2), (4) Date: May 13, 2005

(87) PCT Pub. No.: WO2004/038188

PCT Pub. Date: May 6, 2004

(65) Prior Publication Data

US 2005/0263125 A1  Dec. 1, 2005

(30) Foreign Application Priority Data

Oct. 24, 2002  (JP) ............................. 2002-309661

(51) Int. Cl.
*F16C 33/10* (2006.01)
(52) U.S. Cl. ..................................... 384/288
(58) Field of Classification Search ........ 384/286–288, 384/291, 294, 429–433
See application file for complete search history.

(56) References Cited

U.S. PATENT DOCUMENTS

| 5,009,522 A | 4/1991 | Hahn |
| 6,176,621 B1 | 1/2001 | Naitoh et al. |
| 6,868,810 B2* | 3/2005 | Hojo et al. .................. 384/288 |
| 2005/0196084 A1* | 9/2005 | Kitahara et al. ............. 384/288 |

FOREIGN PATENT DOCUMENTS

| JP | A 58-121315 | 7/1983 |
| JP | U 61-573 | 1/1986 |
| JP | U 62-124317 | 8/1987 |
| JP | A 63-109215 | 5/1988 |
| JP | U 4-113713 | 10/1992 |
| JP | A 07-027127 | 1/1995 |
| JP | A 2001-241442 | 9/2001 |

* cited by examiner

*Primary Examiner*—Thomas R. Hannon
(74) *Attorney, Agent, or Firm*—Oliff & Berridge, PLC

(57) ABSTRACT

An oil-feeding device for a crankshaft where the amount of lubricant oil leaking from supporting areas of main journal portions is reduced without increasing friction of bearing members against the main journal portions. The oil-feeding device for a crankshaft includes upper bearing members and lower bearing members. The upper and lower bearing members have a half hollow cylindrical shape, are provided with crush relief portions at both ends, and jointly encompass main journal portions of a crank shaft. The upper bearing members have circumferentially extending oil grooves provided in the faces opposite the main journal portions, the grooves penetrating through oil passages of a cylinder block. The lower bearing members do not have oil grooves. The oil grooves do not extend in the crush relief portions, and therefore the leakage of lubricant oil, fed to the oil grooves, to the areas of the crush relief portions is suppressed.

3 Claims, 5 Drawing Sheets

OIL-FEEDING DEVICE FOR AN ENGINE CRANKSHAFT

TECHNICAL FIELD

The present invention relates to an engine crankshaft, and more specifically, to an oil-feeding device of a crankshaft.

BACKGROUND ART

An oil-feeding device of a crankshaft of an engine mounted on a vehicle, such as automobile, which has been already known as one of an oil-feeding device as described in Japanese Patent Laid-Open Publication No. 7-27127, is designed to comprise a pair of half-cylindrical bearing members mutually cooperating to surround a main journal portion of a crankshaft, wherein each of the bearing members has a half-circumferential slot provided on its surface facing the main journal portion and communicating with an oil passage of a cylinder block, and the crankshaft has paired pin oil-feeding passages each opening to the main journal portion on one end and a surface of a pin portion on the other end, whereby, whenever the crankshaft is half-rotated, the paired pin oil-feeding passages are made to alternatively communicate with one of the half-circumferential slots on the opposite sides.

According to such an oil-feeding device for a crankshaft, since the paired pin oil-feeding passages each alternatively communicate with one of the half-circumferential slots, feeding lubricating oil onto the surfaces of pin portions through the half-circumferential slots and pin oil-feeding passages for every half-rotation of the crankshaft, an oil passage in a cylinder block and the pin oil-feeding passage are rendered communicated with the whole circumferential area of the crankshaft, and thereby lubricating oil is surely and stably fed to the pin portions.

In general, as shown in FIG. 7, a main journal portion 102 of a crankshaft 100 is supported while being inserted between a main journal supporting portion 106 of a cylinder block 104 and a cap 110 fixed to the lower end of the portion 106 with bolts 108. An upper bearing member 112 of a half-cylinder is interposed between a concaved portion, formed on the underside of the main journal supporting portion 106, and the main journals 102, and a lower bearing member 114 of a half cylinder is interposed between a concaved portion, formed on the upside of the cap 110, and the main journals 102. The bearing members 112 and 114 are mutually joined on their opposite ends and compressed between the main journal supporting portion 106 and cap 110, and thereby the bearing members each are forced to the concaved portions of the main journal bearing portion 106 and cap 110.

In this case, in order to avoid excessive friction between the bearing members 112, 114 and the main journal 102 due to expansion of the opposite ends of the bearing members owing to the compression thereof, the inner surfaces of the bearing members are made gradually offset outwardly toward the opposite ends thereof, forming crush reliefs 116 thereon.

In a conventional oil-feeding device for a crankshaft as described above, a half-circumferential slot 118 formed in the inside of each bearing member is extended over the whole length of the bearing member up to areas where the crush reliefs 116 are formed, so that some of lubricating oil fed to the half-circumferential slot 118 through an oil passage 120 formed in the cylinder block 104 and communicating pores 122 formed in each bearing member would tend to leak from a gap between the main journal 102 and crush reliefs 116.

Moreover, in a conventional oil-feeding device for a crankshaft, when lubricating oil is fed to pin portions of the crankshaft through the pin oil-feeding passages at an adequate amount, irrespective of the aforementioned leakage of lubricating oil from the main journal, the increase in size of an oil pump will be inevitable, causing problems of a drive loss, increased costs and difficulty in mounting the device on a vehicle.

In this connection, JP No. 7-27127 describes an oil-feeding device feeding lubricating oil from one half-circumferential slot of a bearing member of a main journal through a pin oil-feeding passage to two pin portions. This oil-feeding device cannot be used for a crankshaft of a V-type engine which has two pin oil-feeding passages connecting from one main journal to two pin portions on the opposite sides of the journal.

DISCLOSURE OF THE INVENTION

The present invention is made while taking into account the aforementioned problems of a conventional oil-feeding device of a crankshaft in which device at least one of paired bearing members supporting a main journal portion of a crankshaft has a half-circumferential slot and lubricating oil is fed to a surface of a pin portion through a pin oil-feeding passage from the half-circumferential slot. A main object of the present invention is to reduce an amount of lubricating oil leaking from an area supporting a main journal portion by limiting the extending area of a circumferential slot of a bearing member without increasing friction of the bearing member against the main journal portion.

According to the present invention, the aforementioned main object is achieved by an oil-feeding device of a crankshaft comprising a pair of substantially half-cylindrical bearing members mutually cooperating to surround a main journal portion of the crankshaft and having crush reliefs on its opposite ends; one of the bearing members having an oil groove provided on a surface facing the main journal portion, communicating with an oil passage of a cylinder block and extending circumferentially, characterized in that the oil groove is not extended in the crush reliefs, and/or, an oil-feeding device of a crankshaft having a plurality of alternatively disposed first and second main journal portions characterized in that the first main journal portion is supported with the pair of bearing members (first paired bearing members); the second main journal portion is supported with a pair of substantially half-cylindrical bearing members having no oil groove (second paired bearing members); the crankshaft has an internal oil passage extended from a surface of the first main journal portion to surfaces of pin portions on opposite sides of the first main journal portion; and the internal oil passage communicates with the oil groove of one of the bearing members at least one time during one revolution of the crankshaft.

In the above-mentioned structure, in order to attain the aforementioned object effectively, the internal oil passage may be designed to comprise a through passage extending substantially radially through the first main journal portion and a pair of pin oil-feeding passages each communicating with the through passage on its one end and opening on a surface of said pin portion on the other end.

According to the structure of the first paired bearing members, one of the paired substantially half-cylindrical bearing members, mutually cooperating to support the main journal portion of the crankshaft, has the oil groove formed in a surface facing the main journal portion, communicating to the oil passage of the cylinder block and extending circumferentially, which oil groove does not extend in the crush reliefs, and therefore, the amount of lubricant oil, fed from an oil passage in the block to the oil groove of one of the bearing members and leaking from the oil groove to the area of the crush reliefs, can be surely reduced, in comparison with a case of a conventional oil-feeding device in which an oil groove extends also to the crush reliefs. Further, since the amount of lubricant oil, leaking from the oil groove to the area of the crush reliefs, can be surely reduced, an enough amount of lubricant oil can be fed to the pin portions of the crankshaft if it has the pin oil-feeding passages feeding lubricant oil to the pin portions of the crankshaft from the oil groove, and therefore, in comparison with conventional oil-feeding devices, the size of an oil pump can be smaller; drive loss and cost will be reduced; and the mounting of the oil pump on a vehicle become easier.

Moreover, according to the structure of the above-mentioned crankshaft oil-feeding device, the first main journal portion is supported with the first paired bearing members; the second main journal portion is supported with the paired substantially half-cylindrical bearing members having no oil groove; the crankshaft has the internal oil passage extended from the surface of the first main journal portion to the surfaces of the pin portions on the opposite sides of the first main journal portion; and the internal oil passage communicates with the oil groove of one of the bearing members at least one time during one revolution of the crankshaft. Thus, lubricating oil can be certainly fed to the pin portions on the opposite sides of the first main journal portion through the internal oil passage from the oil groove of one of the bearing members of the first main journal, and, since the paired bearing members supporting the second main journal portion have no oil groove, the amount of lubricating oil, leaking from the paired bearing members supporting the second main journal portion, can be reduced certainly.

Moreover, according to the structure of the above-mentioned crankshaft oil-feeding device, when the internal oil passage is designed to comprise a through passage extending substantially radially through the first main journal portion and a pair of pin oil-feeding passages each communicating with the through passage on its one end and opening on the surface of said pin portion on the other end, it is ensured that the internal oil passage communicates with the oil groove except when the opposite ends of the through passage pass through areas other than the oil groove during the rotation of the crankshaft, so that lubricating oil can be fed to the pin portions preferably, as compared with a case where the internal oil passage have a through passage.

In the above-mentioned structure, the other of the first paired bearing members may be designed not to have any oil groove. Further, in the first paired bearing members, the extending area of the oil groove of one bearing member may be designed to be positioned between the inner edges of two crush reliefs, and/or the extending area of the oil groove of one bearing member may be designed to be ended at a position closer to the central portion of the bearing member than the inner edges of the two crush reliefs.

Moreover, in the structure of the above-mentioned present invention, the crankshaft may be designed to have an internal oil passage extending from a surface of the main journal portion to a surface of the pin portion adjacent to this main journal portion. In this case, the number of main journal portions which the crankshaft may have is larger than the number of cylinders in an engine by one. One of the bearing members of one main journal portion may be designed to have no oil groove.

Furthermore, in the aforementioned structure, the internal oil passage of the crankshaft may have two openings spaced apart from one another substantially radially of the first main journal portion, and the internal oil passage may be designed to communicate with an oil groove of one of the bearing members twice during one revolution of the crankshaft.

Further, in the above-mentioned structure, the paired pin oil-feeding passages of the crankshaft are designed to communicate with a through passage at its opposite ends.

BEST MODE OF THE INVENTION

In the followings, with reference to the accompanying drawings, the present invention is explained in detail about several preferable embodiments.

First Embodiment

Figure 1:
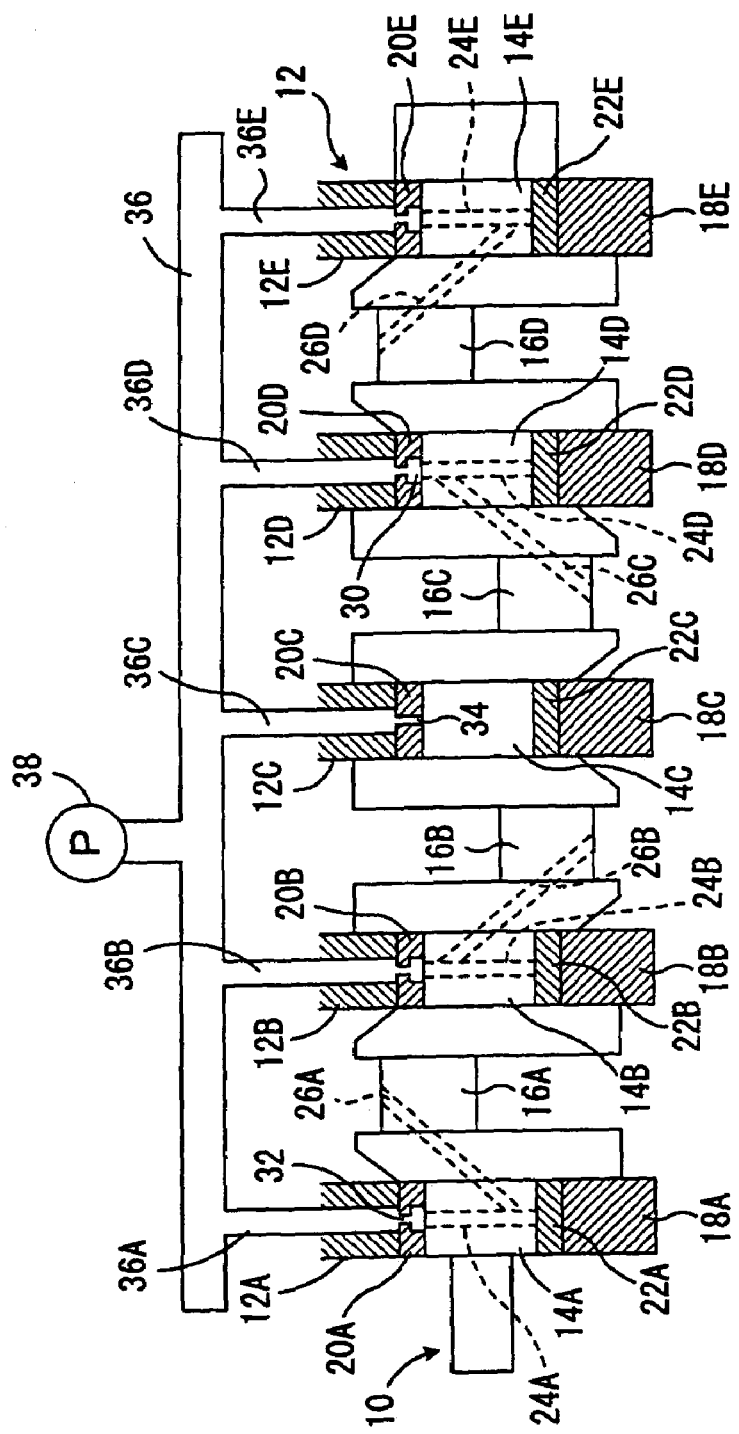
FIG. 1 is a diagrammatic view of a structure showing a first embodiment of an oil-feeding device of a crankshaft according to the present invention applied to an in-line four-cylinder gasoline engine.
Figure 2:
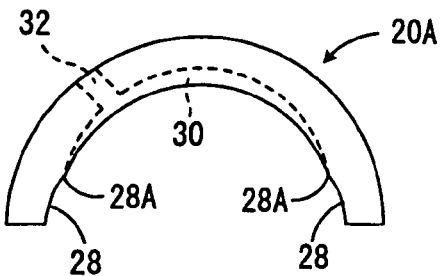
FIG. 2 is a side view showing one of upper bearing members shown in FIG. 1.
Figure 3:
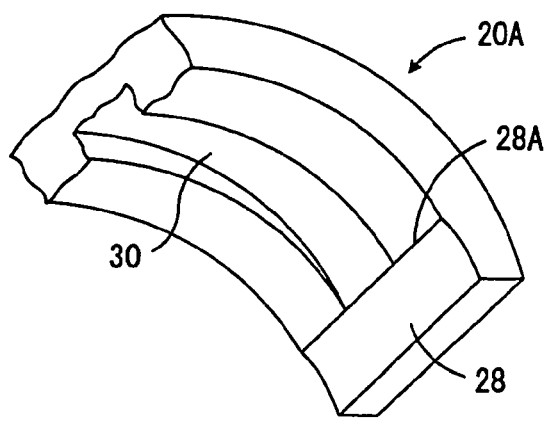
FIG. 3 is an enlarged partial perspective view showing an end of the upper bearing member shown in FIG. 2.

FIG. 1 is a diagrammatic view showing a structure of a first embodiment of an oil-feeding device of a crankshaft according to the present invention, applied to an in-line four-cylinder gasoline engine; FIG. 2 is a side view showing one of the upper bearing members shown in FIG. 1; and FIG. 3 is an enlarged partial perspective view showing an end of the upper bearing member shown in FIG. 2.

In FIG. 1, the reference numeral 10 shows an engine crankshaft, which is rotatably supported by five supporting portions 12A-12E of a cylinder block 12. The crankshaft 10 has five main journal portions 14A-14E and four pin portions 16A-16D, which are located between the main journal portions, offset radially therefrom and circumferentially relative to one another around the axis, and the main journal portions 14A-14E and pin portions 16A-16D are integrally connected to one another with arm portions.

Caps 18A-18E each are fixed to the lower ends of the supporting portions 12A-12E of the cylinder block 12 with bolts not shown in FIG. 1. Half-cylindrical upper bearing members 20A-20E are disposed between half-cylindrical concaved portions, formed on the undersurfaces of the supporting portions 12A-12E, and the main journals 14A-14E, and half-cylindrical lower bearing members 22A-22E are disposed between half-cylindrical concaved portions, formed on the upper surfaces of the caps 18A-18E, and the main journals 14A-14E.

The upper bearing members 20A-20E and lower bearing members 22A-22E are attached with one another at their opposite ends, and pushed onto the concaved portions of supporting portions 12A-12E and those of the caps 18A-18E by compressing the bearing members between bearing portions 12A-12E and Caps 18A-18E, and thus, the bearing members are fixedly held with supporting portions 12A-12E and caps 18A-18E.

In the main journal portions 14A, 14B, 14D and 14E, radially extending through passages 24A, 24B, 24D and 24E are formed, respectively, to which through passages, the respective ends of pin oil-feeding passages 26A-26D are connected. The other end of pin oil-feeding passages 26A, 26B, 26C and 26D are opened to the surfaces of pin portions 16A-16D, respectively. Through passages 24A, 24B, 24D and 24E and pin oil-feeding passages 26A, 26B, 26C, and 26D define internal passages each cooperating to connect the surfaces of main journal portions 14A, 14B, 14D and 14E and the surfaces of pin portions 16A-16D.

As shown in FIGS. 2 and 3 for the upper bearing member 20A, crush reliefs 28 are formed on the opposite ends of the upper bearing members 20A-20E and the opposite ends of the lower bearing members 22A-22E. Further, as shown in FIGS. 2 and 3, on the inner surfaces of the upper bearing members 20A, 20B, 20D, and 20E, i.e., the surface facing the main journal portions 14A, 14B, 14D and 14E, oil grooves 30 extending circumferentially are formed. The depth of an oil groove 30 is designed to become gradually smaller toward the opposite ends of the upper bearing member, being rendered to be 0 at the inner edge 28A of the crush relief 28, and therefore the oil groove 30 is not extended in the crush relief 28.

Figure 4:
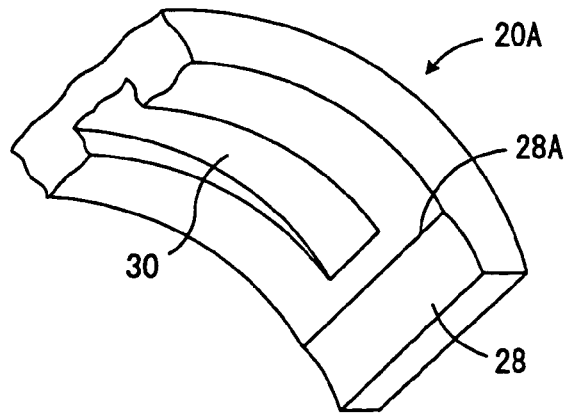
FIG. 4 is an enlarged partial perspective view showing an end of an upper bearing member of a modified embodiment.

In this regard, as illustrated as a modified embodiment of an upper bearing member in FIG. 4, the oil grooves 30, do not extend in the areas of crush reliefs 28, may be ended at positions closer to the central portion of the upper bearing portion relative to the inner edge 28A of the crush relief 28, and the depths of the oil grooves 30 may be substantially constant up to their opposite ends.

On the upper bearing members 20A, 20B, 20D and 20E, provided are communicating pores 32 opening to the corresponding oil grooves 30 on the respective inner ends and opening to the corresponding external surfaces of the upper bearing members on the respective outer ends. On the other hand, no oil groove 30 is formed in the upper bearing member 20C, but a communicating pore 34, opening to the inside of the upper bearing member 20C on the inner end and opening to the external surface of the upper bearing member 20C on the outer end is formed. These communicating pores 32 and 34 communicate with branch portions 36A-36E of the oil passage 36 formed in the cylinder block 12, respectively, and the oil passage 36 is connected to the discharge side of an oil pump 38. In this regard, neither oil groove nor communicating pore is formed in the lower bearing members 22A-22E.

Thus, according to the illustrated first embodiment, lubricating oil discharged out by the oil pump 38 is fed to the oil grooves 30 through the oil passage 36, branch portions 36A-36E and communicating pore 32 of upper bearing members 20A, 20B, 20D and 20E, thereby lubricating the surfaces of main journal portions 14A, 14B, 14D and 14E, and further, lubricating oil is fed to the surface of the main journal portion 14C through the branch portion 36C and the communicating pore 34 of the upper bearing member 20C, thereby lubricating the surface of the main journal portion 14C, i.e., the rotational support portion of the crankshaft 10.

Moreover, the lubricating oil fed to the oil grooves 30 of the upper bearing members 20A, 20B, 20D and 20E is also fed to the surfaces of the pin portions 16A-16D through the through passages 24A, 24B, 24D and 24E and pin oil-feeding passages 26A, 26B, 26C and 26D, thereby lubricating the surfaces of pin portions 16A-16D, i.e. portions linking to connecting rods of the crankshaft 10, not shown in FIG. 1.

In this case, since the oil grooves 30, formed in the insides of the upper bearing members 20A, 20B, 20D, and 20E, are not extended in the crush reliefs 28, it is enabled to reduce the amount of the lubricating oil leaking from the opposite ends of the oil grooves 30 into the spaces between the main journal portion 14A, 14B, 14D, 14E and the opposite ends of the upper bearing members 20A, 20B, 20D, and 20E, i.e. the areas of crush reliefs 28; to preferably feed lubricating oil to the surfaces of pin portions 16A-16D through the through passages 24A, 24B, 24D and 24E and pin oil-feeding passage 26A, 26B, 26C and 26D; to reduce the discharging amount of lubricating oil from the oil pump 38; and to miniaturize the oil pump 38, as compared with a conventional oil-feeding device.

Especially in the illustrated embodiment, since no oil groove 30 is formed in the upper bearing member 20C, the amount of the lubricating oil leaking through the supporting portions of main journal portions 14A-14E can be reduced as compared with a case of an oil-feeding device in which oil grooves equivalent to the oil groove 30 are formed in all upper bearing members.

In this regard, in a particular range of revolution angle in the crankshaft 10 where either of the ends of through passages 24A, 24B, 24D and 24E passes the area of crush reliefs 28, through passages 24A, 24B, 24D and 24E are isolated from the oil groove 30 so that lubricating oil is not pumped into the surfaces of pin portions 16A-16D through pin oil-feeding passages 26A, 26B, 26C, and 26D. However, because that range of revolution angle is small, the lubrication of the surfaces of pin portions 16A-16D will not become insufficient.

In addition, when the revolution angle of the crankshaft 10 is within the above-mentioned particular range of revolution angle, the through passages 24A, 24B, 24D and 24E are isolated from the oil grooves 30 and the pressure in through passages 24A, 24B, and 24D and 24E are reduced, so that lubricating oil in the through passages is not excessively pushed out to the areas of crush reliefs 28 when the ends of through passages 24A, 24B, 24D and 24E passes through the areas of crush reliefs 28.

Second Embodiment

Figure 5:
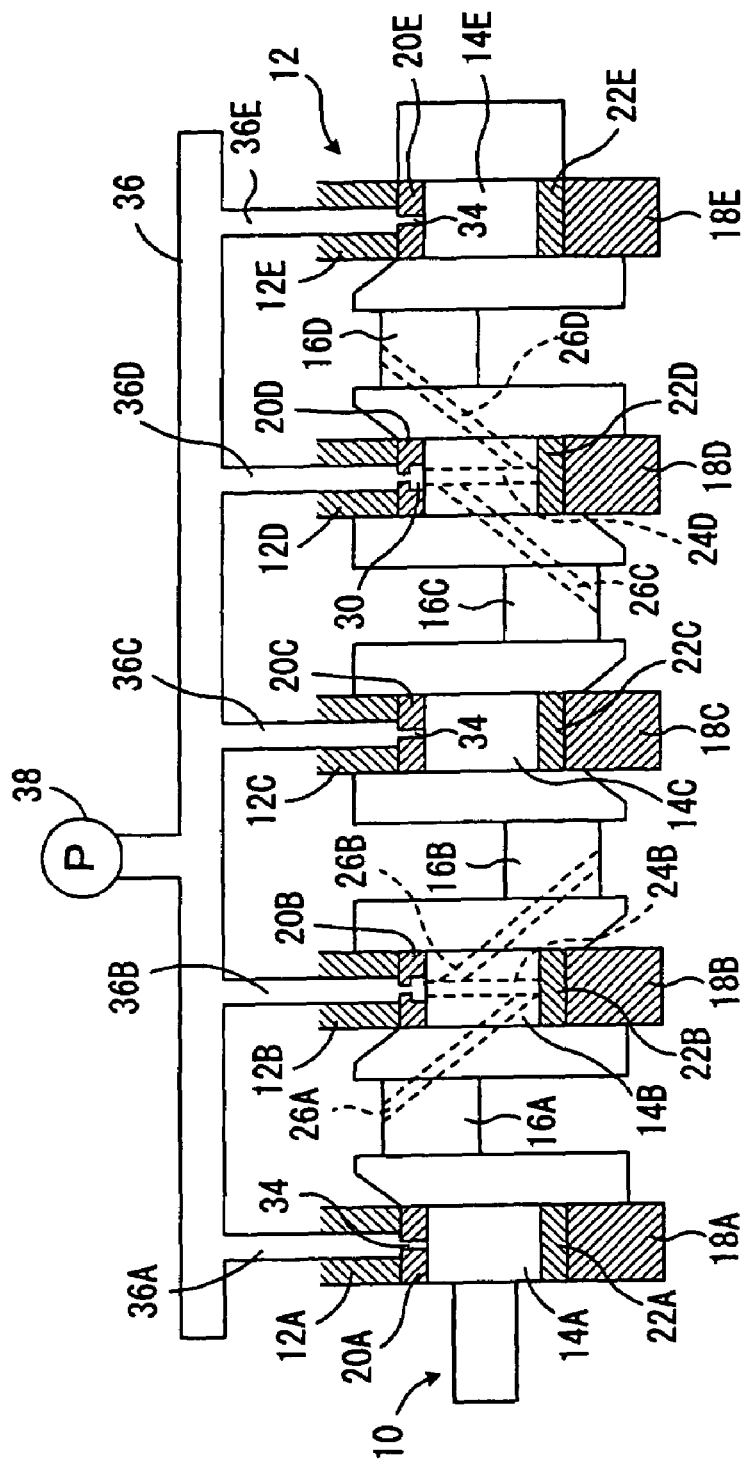
FIG. 5 is a diagrammatic view of a structure showing a second embodiment of an oil-feeding device of a crankshaft according to the present invention, applied to an in-line four cylinder gasoline engine.

FIG. 5 is a diagrammatic view of a structure showing a second embodiment of an oil-feeding device of a crankshaft according to the present invention, applied to an in-line four cylinder gasoline engine. In FIG. 5, the same parts as in FIG. 1 are designated by the same reference numerals as in FIG. 1.

In this second embodiment, as in the main journal portion 14C in the above-mentioned first embodiment, no through passage is formed in the main journal portions 14A, 14C and 14E. Further, as in the upper bearing member 20C of the main journal portion 14C in the first embodiment, no oil groove 30 is formed in the upper bearing members 20A, 20C and 20E of main journal portions 14A, 14C and 14E, but, communicating pores 34 are formed therein.

Moreover, the end of the pin oil-feeding passage 26A is connected to the end of the through passage 24B opposite to its end to which the end of the pin oil-feeding passage 26B is connected. The end of the pin oil-feeding passage 26D is connected to the end of the through passage 24D opposite to its end to which the end of the pin oil-feeding passage 26C is connected. Thus, the through passage 24B on its opposite sides feeds lubricating oil to the surfaces of the pin portions 16A and 16B through the pin oil-feeding passages 26A and 26B, and the through passage 24D on its opposite sides feeds lubricating oil to the surfaces of the pin portions 16C and 16D through the pin oil-feeding passages 26C and 26D.

According to the illustrated second embodiment, the lubricating oil discharged out by the oil pump 38 is fed to the oil grooves 30 through oil passage 36, branch portions 36A-36E and communicating pores 32 of the upper bearing members 20B and 20D, thereby lubricating the surfaces of the main journal portions 14B and 14D. The lubricating oil is also fed to the surfaces of the main journal portions 14A, 14C and 14E through the branch portion 36A, 36C and 36E, and the communicating pores 34 of the upper bearing members 20A, 20C and 20E, thereby lubricating the surfaces of the main journal portions 14A, 14C and 14E, i.e., the rotational support portions of the crankshaft 10.

Further, the lubricating oil, fed to the oil grooves 30 of the upper bearing members 20B and 20D, is fed also to the surfaces of the pin portions 16A-16D through the through passages 24B and 24D and the pin oil-feeding passages 26A, 26B, 26C and 26D, thereby lubricating the surfaces of the pin portions 16A-16D, i.e., portions linking to connecting rods of the crankshaft 10 not shown in FIG. 5.

In this case, as in the above-mentioned first embodiment, since the oil grooves 30, formed in the insides of the upper bearing members 20B and 20D, are not extended in the crush reliefs 28, it is enabled to reduce the amount of the lubricating oil leaking from the opposite ends of the oil grooves 30 into the spaces between the main journal portion 14B, 14D and the opposite ends of the upper bearing members 20B, 20D, i.e. the areas of crush reliefs 28; to preferably feed lubricating oil to the surfaces of pin portions 16A-16D through the through passages 24A, 24B, 24D and 24E and pin oil-feeding passage 26A, 26B, 26C and 26D; to reduce the discharging amount of lubricating oil from the oil pump 38; and to miniaturize the oil pump 38, as compared with a conventional oil-feeding device.

Further, according to this second embodiment, since the number of the upper bearing members having no oil groove 30 is larger than in the above-mentioned first embodiment, the amount of lubricating oil leaking through the supporting portions of the main journal portions 14A-14E can be reduced further, as compared with the first embodiment.

In this regard, also in this second embodiment, in a particular range of revolution angle in the crankshaft 10 where either of the ends of through passages 24B, 24D passes the area of crush reliefs 28, through passages 24B, 24D are isolated from the oil groove 30 so that lubricating oil is not pumped into the surfaces of pin portions 16A-16D through pin oil-feeding passages 26A, 26B, 26C, and 26D. However, because that range of revolution angle is small, the lubrication of the surfaces of pin portions 16A-16D will not become insufficient.

In addition, when the revolution angle of the crankshaft 10 is within the above-mentioned particular range of revolution angle, the through passages 24B, 24D are isolated from the oil grooves 30 and the pressure in through passages 24B and 24D are reduced, so that lubricating oil in the through passages is not excessively pushed out to the areas of crush reliefs 28 when the ends of through passages 24B, 24D passes through the areas of crush reliefs 28.

Furthermore, according to the above-mentioned first and second embodiments, since the depth of an oil groove 30 is designed to become gradually smaller toward the opposite ends of the upper bearing member, being rendered to be 0 at the inner edge 28A of the crush relief 28, the above-mentioned particular range of revolution angle can be made smaller than in the case of the aforementioned modified embodiment. On the other hand, according to the upper bearing members of the modified embodiment, the amount of the lubricating oil leaking to the areas of crush reliefs 28 can be reduced further much more certainly, as compared with the cases of the above-mentioned first and second embodiments.

Figure 6:
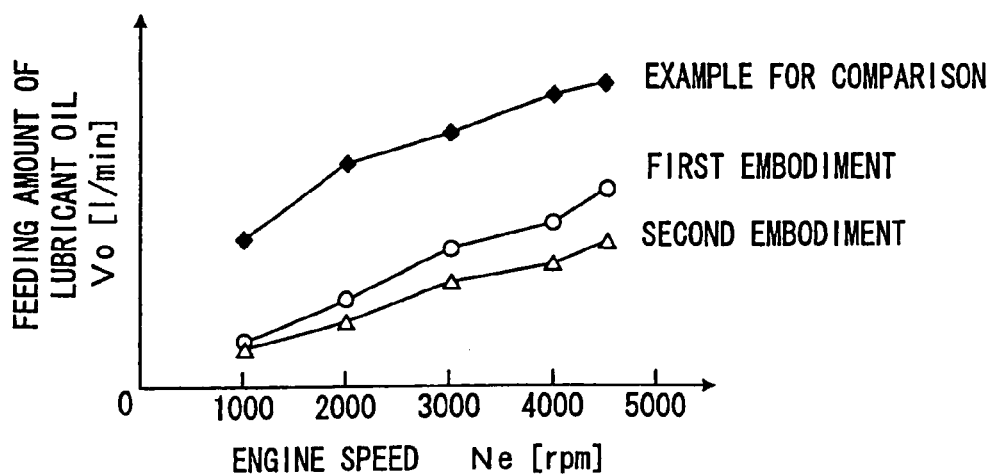
FIG. 6 shows graphs of examples of relations between the number of engine revolutions Ne and the amount of lubricating oil, Vo, fed to a crankshaft in the first embodiment, the second embodiment, and an example for comparison.
Figure 7:
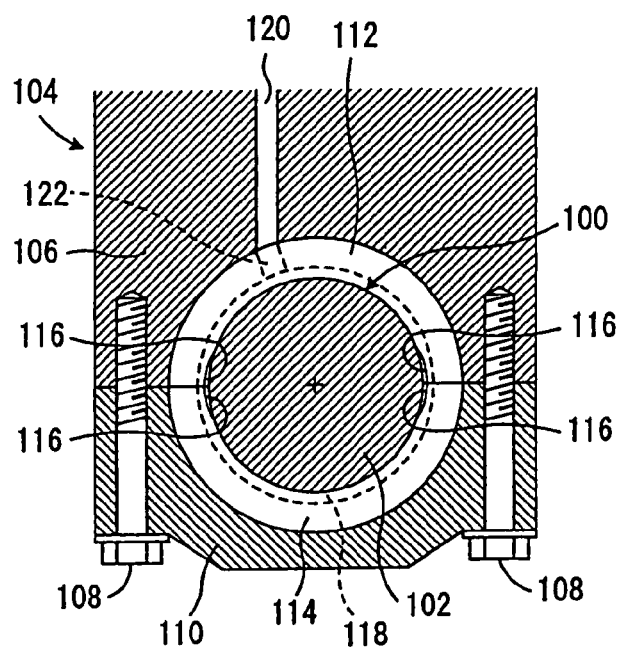
FIG. 7 is an enlarged sectional view showing a supporting device of a main journal portion of a crankshaft.
Figure 8:
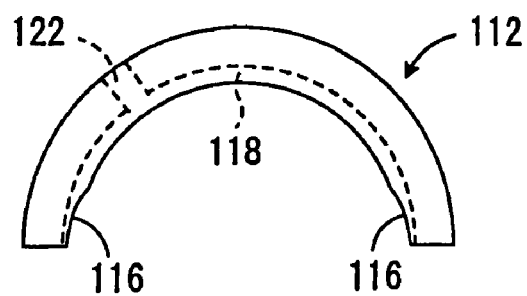
FIG. 8 is a side view showing an upper bearing member in a conventional oil-feeding device.
Figure 9:
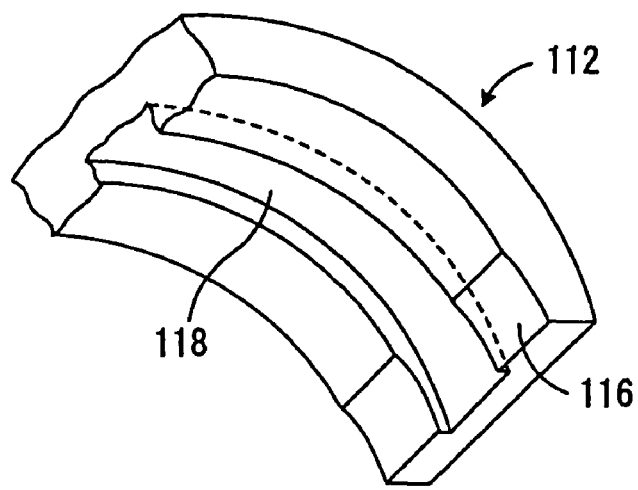
FIG. 9 is an enlarged partial perspective view showing an end of the upper bearing member shown in FIG. 8.

For instance, FIG. 6 shows examples of relations between the number of engine revolutions (engine speed) Ne and the amount of lubricating oil, Vo, fed to a crankshaft in experiments in which in-line four cylinder gasoline engines of 1800 cc equipped with the oil-feeding devices of the first embodiment, the second embodiment and an example for comparison, are operated at various engine speed Ne. Here, the oil-feeding device of the example for comparison was the one in which the upper and lower bearing members in the first embodiment are replaced with the bearing members shown in FIGS. 8 and 9, i.e., the bearing members having an oil groove extending into the areas of crush reliefs.

As seen from FIG. 6, according to the above-mentioned first and second embodiments, irrespective of engine speed Ne, it is enabled to reduce the amount of lubricating oil leaking from the supporting portions of the main journal portions and in turn the amount of lubricating oil fed to the crankshaft, as compared with the example for comparison. Further, it can be seen that the second embodiment can reduce the amount of lubricant oil to be fed to a crankshaft much more than the first embodiment.

Although the present invention has been explained about in detail with respect to the specific embodiments, it should be understood by one of ordinary skill in the art that the present invention will not be limited to the above-mentioned embodiment, and other various embodiments can be made within the limits of the present invention.

For example, although the engine is an in-line four-cylinder gasoline engine in above-mentioned embodiments, the oil-feeding device of the present invention may be applied to gasoline engines other than of four-cylinder type, or diesel engines having any numbers of cylinders, and the oil-feeding device of the above-mentioned second embodiment may be applied to a V type engine.

In addition, although the oil grooves 30 are formed in the upper bearing members 20A, 20B, 20D and 20E other than upper bearing member 20C supporting the central main journal portion 14C, thereby feeding lubricating oil to the surfaces of pin portions 16A-16D from the through passages 24A, 24B, 24D, 24E of the main journal portion 14A, 14B, 14D, 14E through the pin oil-feeding passages 26A, 26B, 26C, 26D in the first above-mentioned embodiment, the oil-feeding device may be so modified that an oil groove 30 is formed also in the upper bearing member 20C while the oil grooves 30 of the upper bearing members 20B, 20D are omitted and a through passage is formed in the main journal portion 14C, thereby feeding lubricant oil to the surfaces of the pin portions 16B and 16C with pin oil-feeding passages communicating with the through passage.

The invention claimed is:

1. An oil-feeding device of a crankshaft comprising a pair of substantially half-cylindrical bearing members mutually cooperating to surround a main journal portion of the crankshaft and having crush reliefs on its opposite ends; one of the bearing members having an oil groove; the oil groove being provided on a surface facing the main journal portion, communicating with an oil passage of a cylinder block and extending circumferentially, wherein the crush reliefs each have an inner edge; the oil groove does not extend into the crush reliefs such that a depth of the oil groove is rendered to be 0 at the inner edge of the crush relief of the corresponding bearing member.

2. An oil-feeding device of a crankshaft having a plurality of alternatively disposed first and second main journal portions characterized in that the first main journal portion is supported with the pair of bearing members of claim 1; the second main journal portion is supported with a pair of substantially half-cylindrical bearing members having no oil groove; the crankshaft has an internal oil passage extended from a surface of the first main journal portion to surfaces of pin portions on opposite sides of the first main journal portion; and the internal oil passage communicates with the oil groove of one of the bearing members at least one time during one revolution of the crankshaft.

3. The oil-feeding device of claim 2, characterized in that the internal oil passage comprises a through passage extending substantially radially through the first main journal portion and a pair of pin oil-feeding passages each communicating with the through passage on its one end and opening on a surface of the pin portion on the other end.

* * * * *